United States Patent [19]
Lohmann et al.

[11] 4,056,791
[45] Nov. 1, 1977

[54] APPARATUS FOR CORRECTING DISTORTION IN LOW FREQUENCY CABLE

[75] Inventors: Reiner Lohmann, Munich; Volker Ludwig, Gelting, both of Germany

[73] Assignee: Siemens Aktiengesellschaft, Munich, Germany

[21] Appl. No.: 627,264

[22] Filed: Oct. 30, 1975

[30] Foreign Application Priority Data

Oct. 31, 1974 Germany .............................. 2451912

[51] Int. Cl.² ............................................. H04B 3/04
[52] U.S. Cl. ...................................... 333/18; 325/42; 330/278
[58] Field of Search .................. 333/18, 28 R; 325/42, 325/65, 473, 477; 330/29, 35; 307/264

[56] References Cited
U.S. PATENT DOCUMENTS

| | | | |
|---|---|---|---|
| 3,423,535 | 1/1969 | Hochgraf et al. ................. | 333/18 X |
| 3,488,604 | 1/1970 | Smilowitz ............................ | 330/29 |
| 3,568,100 | 3/1971 | Tarbox ................................. | 333/18 |
| 3,728,649 | 4/1973 | Waldhauer ........................... | 333/18 |
| 3,840,756 | 10/1974 | Jones ................................. | 330/29 X |
| 3,895,310 | 7/1975 | Warren ............................... | 330/29 X |

*Primary Examiner*—Paul L. Gensler
*Attorney, Agent, or Firm*—Schuyler, Birch, Swindler, McKie & Beckett

[57] ABSTRACT

Apparatus for correcting attenuation distortion in low frequency cable carrying a base-band signal from a transmitter to a receiver is described. A measuring device produces an indicating signal having a value dependent on the peak value of the base-band signal appearing in the region of the receiver. The receiver contains an amplifier, the gain of which is controlled by a RC element. The indicating signal is used to regulate the gain of the amplifier so that the cable and the amplifier together produce a substantially constant attenuation characteristic within a given low frequency range.

4 Claims, 3 Drawing Figures

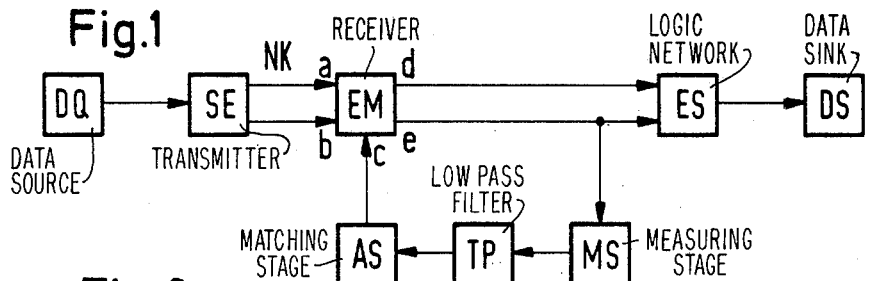
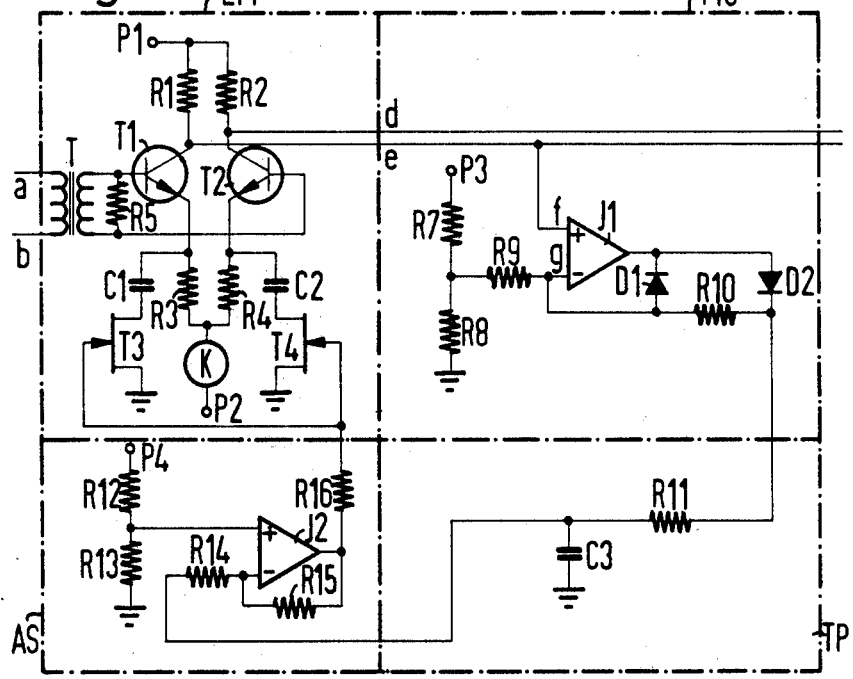
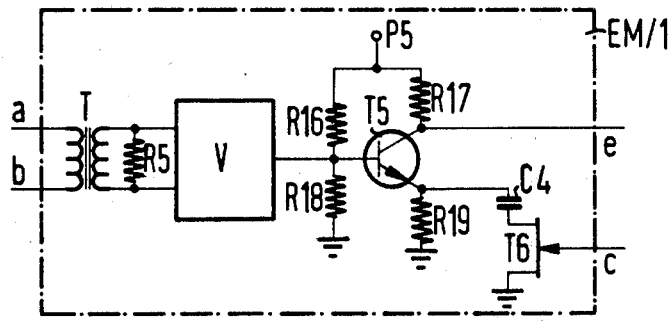

APPARATUS FOR CORRECTING DISTORTION IN LOW FREQUENCY CABLE

BACKGROUND OF THE INVENTION

This invention relates to apparatus for correcting the distortion of the attenuation course of a non-loaded, e.g., by coil, low frequency cable, in which the cable is connected to a transmitter and to the receiver, and in which a base band signal is transmitted.

In transmission systems in which a base band signal is transmitted via a cable link from a transmitter to a receiver, as is known, the receiver contains a distortion correcter with the aid of which the attenuation characteristic of the cable is manually adjusted in order to transmit the base band signal over as long as possible distances. Distortion correcters of this kind usually comprise an amplifier which contains an RC element with which it is possible to influence the gain of the amplifier. It is known to use the series combination of a capacitor and a potentiometer as the RC element, in which case the distortion correction is effected by manual adjustment of the potentiometer resistor. This manual adjustment of the distortion correction is disadvantageous since in the production of the receivers it is not possible to predict which cable must be connected to the receiver in the operating state, so that the distortion correction of the attenuation characteristic need only be effected before the receiver is set in operation.

An object of the invention is to provide apparatus for the automatic distortion correction of the attenuation characteristic of a low frequency cable.

SUMMARY OF THE INVENTION

The invention is based on the recognition that the frequency responses of different low frequency cables differ only slightly from one another at approximately equal cable resistances. In this connection, experiments were carried out on cable wires of low frequency cables having diameters of 0.4 mm, 0.6 mm, 0.8 mm, 0.9 mm taking into account various cable capacitances, and it was recognized that it is possible assuming a specific transmitting voltage, to determine the correct distortion correction setting from the value of the amplitude of the receiving voltage. In this case a frequency range from 0 to 100 kHz was considered.

In accordance with the invention a measuring stage is provided which emits a measuring signal having a value which is dependent upon the peak value of a base band signal which is obtained in the region of the receiver. The receiver contains an amplifier whose gain may be controlled with a RC element, and, employing the measuring signal, the amplification of the amplifier is adjusted in such manner that cable and amplifier together exhibit a substantially constant attenuation characteristic within a low frequency range.

In accordance with the invention automatic distortion correction of the attenuation characteristic of a low frequency cable is carried out in such a way that during production it is possible to take into account all those measures which are of essential importance later during the operation of the circuit arrangement for distortion correction of the attenuation characteristic, irrespective of which low frequency cable is connected during the later operation. In order to control the gain of the amplifier with a RC element, it is advantageous to connect a controllable resistor in series with a capacitor and in particular to use the switching path of a field effect transistor as that controllable resistance. Field effect transistors are particularly suitable as controllable resistances because the distortion correction of the attenuation characteristic may be set in optimal fashion on the basis of the characteristic curves of the transistors.

If the primary concern is low expense, it is advantageous to conduct the base band signal through a preliminary amplifier to a transistor amplifier, whose emitter is connected to a series combination of a capacitor and a field effect transistor.

If, in addition to attenuation distortion correction, signal interferences are also to be suppressed, it is advantageous to conduct the base band signal to a differential amplifier with two transistors whose emitters are each connected to a series combination of a capacitor and a field effect transistor.

BRIEF DESCRIPTION OF THE DRAWINGS

In the following preferred embodiments of the invention will be described making reference to FIGS. 1 to 3, in which identical components appearing in more than one figure are provided with like references.

FIG. 1 is a block-schematic circuit diagram of a base band transmission system constructed according to the invention.

FIG. 2 is a schematic diagram of apparatus according to the invention arranged at the receiving end for correcting the distortion of the attenuation characteristic.

FIG. 3 is a schematic diagram of an alternate embodiment illustrating an amplifier usable in the FIG. 2 circuit whose amplification is adjustable.

DETAILED DESCRIPTION OF PREFERRED EMBODIMENTS

The base band transmission system illustrated in FIG. 1 comprises a data source DQ, a transmitter SE, a receiver EM, a logic network ES, a data sink DS, a measuring stage MS, a low pass filter TP, and a matching stage AS. The data source DQ can, for example, be in the form of a teleprinter whose signal is conducted possibly via a coder, which is not shown, and via a pulse shaping stage, which is not shown, to the transmitter SE. A pulse shaper stage of this type would reshape the signal into a signal form which is favorable for transmission. Details relating to possible recoding and pulse shaping will not be discussed herein, however, as they are assumed to be already known.

The transmitter SE is connected by the low frequency cable NK to the receiver EM. Across this low frequency cable NK, a base band signal is conducted via inputs $a$ and $b$ to the reciever EM, and via the outputs $d$ and $e$ an amplified base band signal is fed to the logic network ES. Using this logic network ES, in the known manner, the probable amplitude theoretical values are determined from the amplitudes of the base signal which occur at specific instants of time, and are conducted to the data sink DS. A teleprinter can again be provided, for example, as data sink DS.

In the transmission of the base band signal the low frequency cable NK effects a frequency-dependent attenuation of the base band signal which attenuation must be compensated, in the region of the receiver EM by corresponding amplification. It is desirable to emit via the outputs $d$ and $e$ of the receiver EM, a base band signal which is attenuated to an approximately equal extent throughout the frequency range between 0 and 100 kHz and which thus exhibits a constant attenuation characteristic. Even when the low frequency cable NK is permanently installed, and the attenuation distortion correction can also be effected manually, it is still advantageous to automatically correct for attenuation distortion. This correcting problem can then be taken into account during the course of production of the system so that no further adjustments need be made at a later time, irrespective of which types of low frequency cable NK are actually connected to the receiver EM. Automatic attenuation distortion correction is also advantageous because it cannot be definitely ruled out that the attenuation produced by the low frequency cable NK will not alter in the course of time so that the attenuation curve must be re-corrected.

For the automatic attenuation correction, the measuring stage MS is supplied with the base band signal, and it emits a measuring signal which is dependent upon the peak value of the base band signal. It would be basically conceivable to connect this measuring stage MS, not to the output $e$, but to one of the inputs $a$ or $b$, in order to receive the base band signal. However, the base band signal is in any case to be obtained from a point at which the attenuation of the base band signal effected by the low frequency cable NK is clearly signalled.

The measuring signal emitted by the measuring stage MS is conducted to the low-pass filter TP which smooths the measuring signal. The low pass-filter TP is connected to the matching stage AS which serves to match the amplitude of the smoothed measuring signal to the requirements of the receiver EM.

FIG. 2 is a detailed illustration of the receiver EM, the measuring stage MS, the low-pass filter TP and the matching stage A. The receiver EM comprises reistors R1, R2, R3, R4, R5, transistors T1, T2, capacitors C1, C2, field effect transistors T3, T4, constant current source K and transformer T.

Terminal P1 is connected to a positive operation voltage of, for example, +12V and terminal point P2 is connected to a negative operating voltage of −12V. A reference or ground potential of 0V is in this case provided. The base band signal is coupled to inputs $a$ and $b$ and through transformer T to the base electrodes of the transistors T1 and T2 which are parts of the illustrated differential amplifier. The frequency response of this differential amplifier is influenced by two RC elements, one of which is formed by a series connection of capacitor C1 and field effect transistor T3, and the other of which is formed by a series connection of capacitor C2 and field effect transistor T4.

The measuring stage MS comprises resistors R7, R8, R9, R10, operational amplifier J1 and two diodes D1, D2.

Terminal P3 is connected to a voltage of +12V. In combination with the diodes D1, D2 and the resistor R10, the operational amplifier J1 produces a single-sided amplification. At input $f$, the amplifier receives the base band signal and at input $g$ it receives a constant comparison voltage. The output of operational amplifier J1 emits a voltage which is dependent upon the difference between the voltages connected to the two inputs $f$ and $g$. The output signal of the measuring stage MS is conducted to the low-pass filter TP which comprises resistor R11 and capacitor C3 and which serves to smooth the signal.

The matching stage AS comprises operational amplifier J2 and resistors R12, R13, R14, R15, and R16.

Terminal P4 is connected to a voltage of, for example, +12V. The signal received at the matching stage input at resistor R14 is matched in terms of amplitude to the signals in receiver EM, so that the signal emitted via the resistor R16 to receiver input $c$ is suitable to control the two field effect transistors T3 and T4. Using measuring stage MS, low-pass filter TP and matching stage AS, a measuring signal is obtained which is dependent upon the peak value of the bass band signal emitted via the output $e$. With this measuring signal the field effect transistors T3 and T4 operating as controllable resistors are controlled in such manner that a constant attenuation characteristic is attained.

FIG. 3 shows another exemplary embodiment of a receiver EM/1 which can be used in place of the reciver EM illustrated in FIG. 1. This receiver EM/1 comprises a preliminary amplifier V, transistor T5, field effect transistor T6, resistors R16, R17, R18, R19, and capacitor C4.

Terminal P5 therein is connected to an operating voltage of, for example, +12V, and the illustrated ground terminals, in this case, are connected to a potential of 0V. The base band signal is coupled via the inputs $a$ and $b$ to the transformer T and therethrough to the preliminary amplifier V whose output signal is fed to the base of the transistor T5. The emitter of transistor T5 is connected to a RC element which is composed of capacitor C4 and the field effect transistor T6, and which serves to automatically adjust the attenuation characteristic. The field effect transistor T6 is regulated as a controllable resistance using a measuring signal which is coupled to input $c$. The measuring signal can be obtained in the same way as illustrated in FIG. 2, using the measuring stage MS, the low-pass filter TP and the matching stage AS.

The preferred embodiments described hereinabove provide examples of apparatus constructed to operate according to the principles of the invention. It is contemplated that the invention, as defined by the appended claims, encompasses a variety of modifications to or changes in the construction or operating parameters of the described embodiment. Accordingly, they are not to be considered as limiting the scope of the invention.

We claim:
1. Apparatus for equalizing the attenuation characteristic in audio frequency cable connected for carrying a base band signal from a transmitter to a receiver comprising:
measuring circuit means for producing a measuring signal having a value which is dependent on the peak value of said base band signal in the region of said receiver and
differential amplifier means in said receiver comprising first and second amplifier elements, the conductive paths of which are, respectively, connected in series with a gain control means comprising a capacitance connected in series with the drain-source path of a field effect transistor, said gain control means being responsive to said measuring signal such that said audio frequency cable and said differential amplifier means together exhibit a substantially constant attenuation characteristic within a predetermined low frequency range.

2. The apparatus defined in claim 1 wherein said measuring means comprises an operational amplifier having first and second channels, an input of one of said channels being connected to said cable and the input to the other of said channels being connected to a reference potential, the output of said operational amplifier being the output of said measuring means.

3. The apparatus defined in claim 1 further comprising:
a series combination of a low-pass filter and matching means connecting the output of said measuring means to said gain control means, said matching means matching the output impedance of said measuring means to that of said gain control means.

4. Apparatus for equalizing the attenuation characteristic of an audio frequency cable which is connected to carry a base band signal from a transmitter to a receiver comprising:
measuring means for producing a measuring signal having a value dependent upon the peak value of said base band signal in the region of said receiver and
amplifier means and gain control means for said amplifier means in said receiver, said amplifier means comprising at least a transistor, said gain control means comprising a capacitor connected in series with the drain-source path of a field effect transistor, said gain control means being connected in series with the emitter of said transistor, whereby said gain control means using said measuring signal controls the gain of said amplifier means such that said audio frequency cable and said amplifier together exhibit a substantially constant attenuation characteristic.

* * * * *